July 21, 1970
S. A. AHMED ET AL
3,521,119
RF EXCITATION PUMPING OF GAS LASERS BY MEANS
OF A WAVE GUIDE AND COUPLING COILS
Filed Jan. 10, 1968
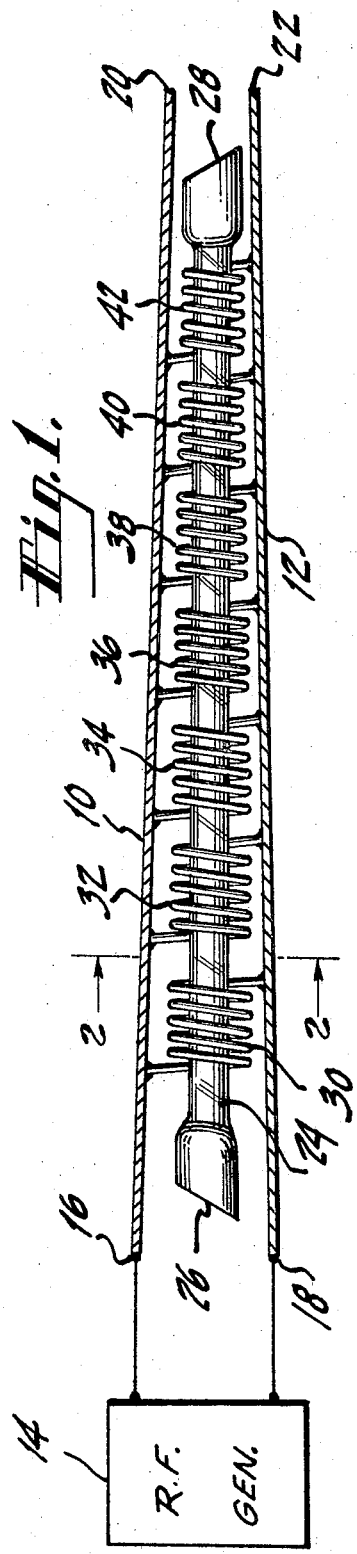
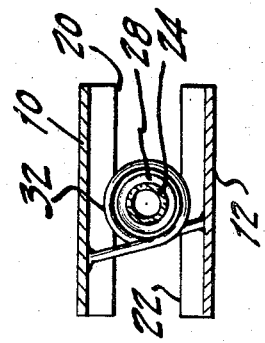
Inventors:
Samir A. Ahmed
Thomas J. Faith, Jr., &
Graham W. Hoffman
By George J. Seligsohn
Attorney

United States Patent Office 3,521,119
Patented July 21, 1970

3,521,119
RF EXCITATION PUMPING OF GAS LASERS BY MEANS OF A WAVE GUIDE AND COUPLING COILS
Samir A. Ahmed, New York, N.Y., Thomas J. Faith, Jr., Trenton, N.J., and Graham W. Hoffman, Knoxville, Tenn., assignors to RCA Corporation, a corporation of Delaware
Filed Jan. 10, 1968, Ser. No. 696,812
Int. Cl. H01j 7/44; H01s 3/09; H01b 41/23
U.S. Cl. 315—39    3 Claims

ABSTRACT OF THE DISCLOSURE

There is disclosed highly efficient apparatus for exciting a high energy density, highly ionized gas discharge with RF energy, which is particularly useful as pump means for an ion gas laser. The apparatus comprises a tapped transmission line, which is preferably a two-plate transmission line, having RF energy applied to the proximate ends thereof. Each of a plurality of coils oriented in colinear serial relationship surround a gas tube which is located between the plates with its axis substantially parallel to the direction of propragation of the RF energy down the transmission line. These coils, which have opposite ends thereof connected respectively to the first and second plates, are distinguished by the fact that the maximum diameter of any one of the plurality of coils is less than the minimum diameter of any other of the plurality of coils which is located closer to the proximate ends of the plates than that one coil and the minimum diameter of any one of the plurality of coils is more than the maximum diameter of any other of the plurality of coils which is located to the distal ends of the plates than that one coil.

---

The invention herein described was made in the course of or under a contract or subcontract thereunder with the Department of the Army.

This invention relates to improved means for exciting a gas discharge within a tube enclosing a dischargeable gas with RF energy and, more particularly, to such means which are specially suitable as a pump for an ion gas laser.

As is known, a gas laser consists of a dischargeable gas, such as one or more of the noble gases, for instance, at suitable pressure within an enclosure; pump means for exciting the dischargeable gas within the enclosure to cause a light producing gas discharge plasma to be formed within the enclosure; and an optical resonant cavity, consisting of a pair of mirrors, in cooperative relationship with the enclosure for reflecting light photons produced in the plasma back and forth through the length of the enclosure.

The present invention particularly concerns the ion (e.g., Ar) gas laser pump means. Ion laser pump means may be divided into two classes: (1) those utilizing a DC discharge between a cathode electrode and an anode electrode placed respectively within a gas tube enclosure at opposite ends thereof across which a proper DC voltage may be applied, and (2) those utilizing RF energy for exciting the enclosed gas atoms. RF energy pump means have the advantage of not requiring any electrodes within the gas enclosure.

The main disadvantages of DC pump means for gas lasers is that the required cathode and anode electrodes tend to adsorb the enclosed gas and further that these electrodes deteriorate over a period of time due to such effects as overheating and cathode sputtering. Since RF pump means do not utilize any electrodes, they are not subject to these disadvantages. However, one of the difficulties with RF pumping of gas lasers is to provide a sufficient degree of coupling between the gas atoms within the gas enclosure and the RF energy field to achieve the high electron temperature required to produce a laser output of reasonably high power.

In the past, in order to provide this required degree of coupling, the gas enclosure was made in the form of a rectangular ring, being composed of four tubes interconnecting at the corners of the rectangle. Coils surrounding these tubes and coupled to an RF generator produced a gas discharge plasma within all the tubes of the rectangular ring. Since in this case the plasma forms a closed loop, a high degree of coupling between the RF pump means and the gas forming the plasma is achieved. However, one, and only one, of the four tubes forming the rectangular ring comprises the gas laser, i.e., the optical resonant cavity is in cooperative relationship with only this one tube and a coherent light beam is produced solely from this one tube in a direction parallel to the axis thereof. It will be seen that the input RF energy which is effective in exciting the gas within the other three tubes of the rectangular ring, although necessary to achieve the required high electron temperature within the gas plasma, is wasted as far as contributing to the output power of the laser. Therefore, in the past the efficiency of RF pump means for gas lasers (the ratio of the laser output to the RF energy input) has been relatively low compared with DC pump means for lasers.

It is therefore an object of the present invention to provide an improved RF pump means for lasers.

Briefly, the present invention contemplates a gas enclosure comprising a single tube, rather than the four tubes making up the rectangular ring, which is placed in cooperative relationship with a tapped transmission line having a plurality of taps along the length thereof each of which corresponds to a different portion of the single tube along the length thereof. One end of the transmission line is connected to terminals supplied with RF energy, whereby a wave of RF energy travels down the line and reaches each of the taps in successive order. Individual means are provided for coupling each respective tap of the transmission line to solely that portion of the tube with which it corresponds with a degree of tightness which is a direct function of the ordinal position of that tap with respect to the terminals.

In a preferred embodiment of the present invention, the transmission line is a two-plate transmission line, in which the two plates may be parallel but are preferably tapered toward each other in a direction extending from the proximate ends thereof, to which RF energy is supplied, to the distal ends thereof. Each of a plurality of coils oriented in colinear serial relationship have their respective opposite ends coupled to the first and second plates. These coils, which surround the gas tube, are distinguished by the fact that the maximum diameter of any one of the plurality of coils is less than the minimum diameter of any other of the plurality of coils which is located closer to the proximate ends of the plates than that one coil and the minimum diameter of any one of the plurality of coils is more than the maximum diameter of any other of the plurality of coils which is located closer to the distal ends of the plates than that one coil.

These and other objects, features and advantages of the present invention will become more apparent from the following detailed description taken together with the accompanying drawing in which:

FIG. 1 shows a side view of the preferred embodiment of the present invention; and FIG. 2 shows a cross section of the embodiment shown in FIG. 1.

Referring now to the drawing, there is shown a two-plate transmission line comprising plate 10 and plate 12. RF generator 14 has a first terminal thereof connected to proximate end 16 of plate 10 and a second terminal thereof connected to proximate end 18 of plate 12. Plates 10 and 12 form a transmission line for transmitting waves of RF energy from RF generator 14 in a direction extending from proximate ends 16 and 18 toward distal ends 20 and 22 thereof. As shown plates 10 and 12 are tapered so that the distance between proximate ends 16 and 18 thereof is greater than the distance between distal ends 20 and 22 thereof. Located midway in between plates 10 and 12 is located laser tube 24 filled with a dischargeable gas. As shown, the respective ends of tube 24 are covered with optical windows 26 and 28 oriented at Brewster's angle. In practice, tube 24 would be located within an optical resonant cavity formed by mirrors (not shown) located respectively in cooperative relationship with window 26 and window 28 to reflect at least most of the light impinging thereon back in an axial direction through tube 24. The laser optical resonant cavity has not been shown because it does not form any part of the present invention, the present invention being specifically directed to improved means for exciting the gas within tube 24 to thereby pump the gas laser.

Surrounding tube 24 are a plurality of coils 30, 32, 34, 36, 38, 40 and 42, each of which is aligned as shown with its axis parallel to the axis of tube 24 and with one end thereof connected to plate 10 and the other end thereof connected to plate 12. What distinguishes coils 30, 32, 34, 36, 38, 40 and 42 from each other is that each of the turns of coil 30, which is located closer to proximate ends 16 and 18 of plates 10 and 12, has a diameter which is greater than each of the turns of coil 32, which in turn has a diameter which is greater than the diameter of each of the turns of coil 34, etc., as shown. Thus, the diameter of each of the turns of coil 42, which is located closest to distal ends 20 and 22, is less than that of any of the other coils.

Although in the preferred embodiment shown in FIGS. 1 and 2 the diameter of the respective turns of each individual coil are equal, the coils themselves may be tapered so that the diameter of each turn of the coil which is located closer to the proximate ends 16 and 18 of plates 10 and 12 is greater than the diameter of each turn of that coil which is located further from the proximate ends 16 and 18 of plates 10 and 12. In any case, the respective diameters of all the turns of a coil lying closer to proximate ends 16 and 18 of plates 10 and 12 is greater than the diameter of any turn of a coil which lies more remote from proximate ends 16 and 18 of plates 10 and 12 with respect to the first mentioned coil. With the coil structure shown in FIGS. 1 and 2, RF energy traveling down plates 10 and 12 is relatively more loosely coupled to the gas plasma within tube 24 by large diameter coils, such as coil 30, located closer to proximate ends 16 and 18 and is relatively more tightly coupled to tube 24 by small diameter coils, such as coil 42, located closer to distal ends 20 and 22 of plates 10 and 12. This provides optimum coupling of the RF energy to that individual portion of tube 24 in cooperative relationship with each separate one of the respective coils. Thus, the RF energy traveling down the transmission line from proximate ends 16 and 18 toward distal ends 20 and 22 is not short-circuited by the plasma in cooperative relationship with coils, such as coils 30 and 32, close to the proximate ends of the transmission line. This together with the tight coupling provided by coils, such as coils 40 and 42, toward distal end of the transmission line permits proper distribution of the RF energy to be coupled to the plasma in cooperative relationship with each of these coils.

What is claimed is:
1. A device for exciting a high energy density, highly ionized gas discharge within a tube enclosing a dischargeable gas with RF energy supplied to RF terminals having a predetermined location with respect to that of said tube, said device comprising a tapped transmission line having a plurality of taps along the length thereof each of which corresponds to a different portion of said tube along the length thereof, one end of said transmission line being connected to said terminals, whereby a wave of RF energy travels down said line and reaches each of said taps in successive orders, and individual means coupling each respective tap of the transmission line to solely that portion of the tube with which it corresponds with a degree of tightness which is a direct function of the ordinal position of that tap with respect to said terminals.

2. A device for exciting a gas discharge within a longitudinal tube enclosing a dischargeable gas, said device including a two plate transmission line comprising first and second plates, means for applying a radio frequency voltage between proximate ends of said first and second plates for transmission of a radio freqeuncy wave down said transmission line from said proximate ends toward the distal ends of said first and second plates, a plurality of coils comprising first and second coils lying between said plates with the axes of said plurality of coils oriented in colinear serial relationship substantially parallel to the direction of transmission of said wave down said line and with the opposite ends of said first coil coupled respectively to a first point of said first plate and a first point of said second plate while the opposite ends of said second coil are coupled respectively to a second point of said first plate and a second point of said second plate, said second coil and said second points of said first and second plates being located closer to the distal ends of said plates than are located the first coil and said first points of said first and second plates, said first coil having a minimum diameter which is greater than the maximum diameter of said second coil, and said tube being adapted to be surrounded by said plurality of coils with its longitudinal axis disposed substantially parallel to the axes of said coils.

3. The device defined in claim 2, wherein said plurality of coils further comprises at least one other coil with the opposite ends thereof coupled respectively to another point of said first plate and another point of said second plate, said other coil and said other points of said first and second plates being located closer to the distal ends of said plates than are located the first coil and said first points of said first and second plates but closer to the proximate ends of said plates than are located the second coil and said second points of said first and second plates, the maximum diameter of said other coil being less than the minimum diameter of any of said plurality of coils which is located closer to the proximate ends of said plates than that other coil and the minimum diameter of another coil being more than the maximum diameter of any of said plurality of coils which is located closer to the distal ends of said plates than that other coil.

References Cited
UNITED STATES PATENTS 3,085,189    4/1963    Thonemann et al.   315—39 X
3,323,010    5/1967    Bisjak et al.   315—248 X

OTHER REFERENCES

"Microwave Electron Cyclotron Resonance Pumping of a Gas Laser," by S. A. Ahmed & R. Kocher, pp. 1737 and 1738, vol. 52, December 1964, proceedings of the IEEE.

"Ring Discharge Excitation of Gas Ion Lasers," by W. E. Bell, pp. 190 and 191, vol. 7, No. 7, Oct. 1, 1965, Applied Physics Letters.

JAMES W. LAWRENCE, Primary Examiner
C. R. CAMPBELL, Assistant Examiner

U.S. Cl. X.R.
315—248; 331—94.5